May 4, 1965   J. C. HURLBURT   3,181,686
MOUNTING STRUCTURE
Filed April 29, 1963
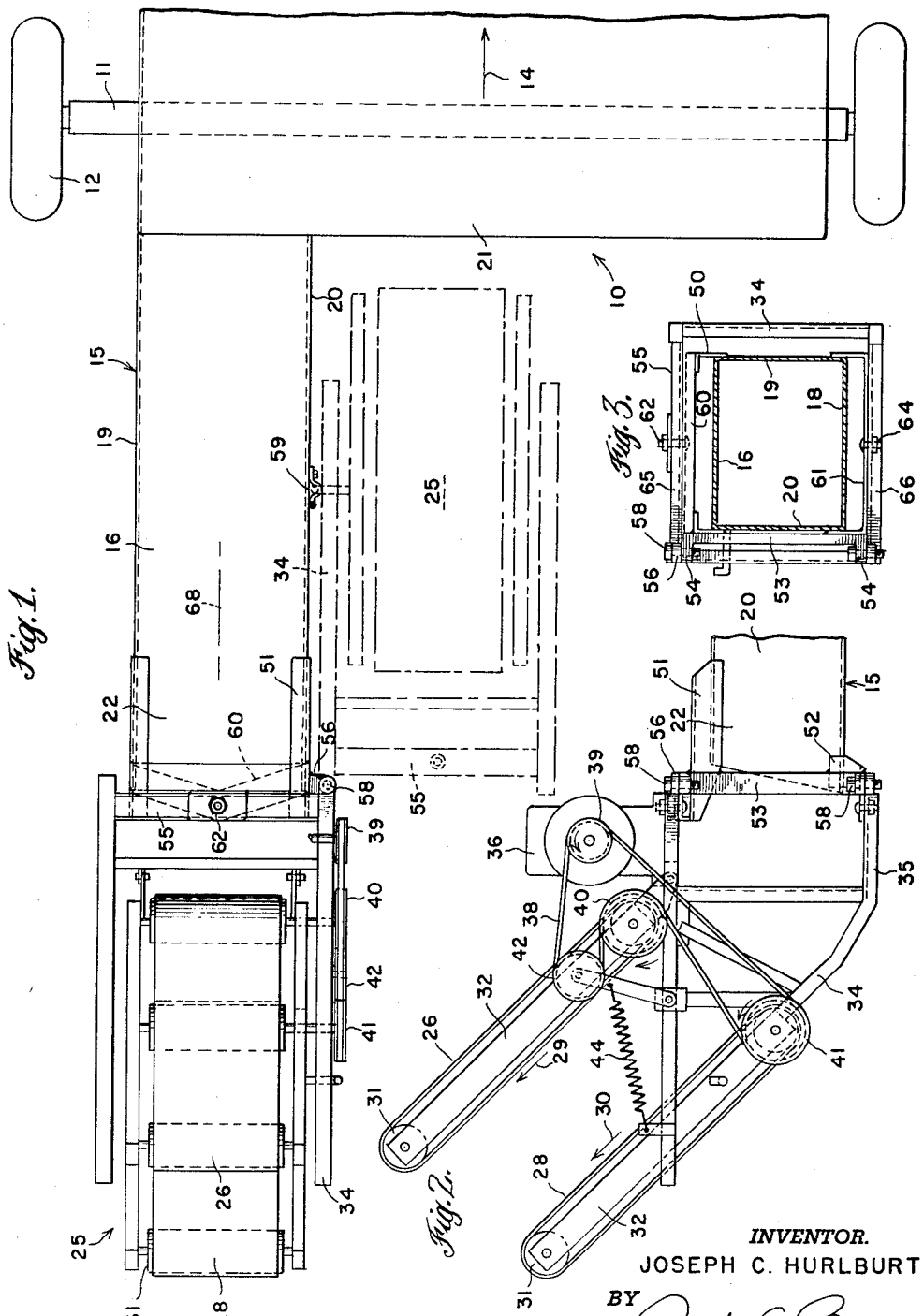
INVENTOR.
JOSEPH C. HURLBURT
BY Joseph A. Brown
ATTORNEY

United States Patent Office 3,181,686
Patented May 4, 1965

1

3,181,686
MOUNTING STRUCTURE
Joseph C. Hurlburt, New Holland, Pa., assignor to Sperry Rand Corporation, New Holland, Pa., a corporation of Delaware
Filed Apr. 29, 1963, Ser. No. 276,630
4 Claims. (Cl. 198—87)

This invention relates generally to bale throwers for hay balers and more particularly to an improved structure for mounting a thrower on a baler.

There are occasions when an operator of the hay baler prefers to use a bale thrower for loading bales onto a trailing wagon. On other occasions he may wish to use the baler without the thrower. However, with present thrower mounting structures, this is not conveniently available. A thrower commonly weights over five hundred pounds and a hoist or some kind of lift is required to mount the thrower on the baler or to remove it. Mounting or dismounting a thrower is not a task which can be performed without some time and equipment. Thus, a baler is used with a thrower or without one. Regular switching from one way to another is not practiced.

A main object of this invention is to provvide a mounting structure for connecting a bale thrower to a baler whereby the thrower may be selectively positioned in a bale throwing location or in a position wherein the baler may be operated without the thrower.

Another object of this invention is to provide a bale thrower mounting structure of the character described wherein the thrower is supported on the baler regardless of whether it is positioned to receive bales or in a storage location.

Another object of this invention is to provide a bale thrower mounting structure whereby an operator may move the thrower from one location to another in a very short time and with no lifting or heavy labor required.

A further object of this invention is to provide a bale thrower mounting structure whereby when the thrower is positioned in an inoperative storage location, the thrower does not interfere with the normal operation of the baler.

A still further object of this invention is to provide a bale thrower mounting structure whereby when the thrower is in a storage location it does not project laterally from the normal path of travel of the baler.

A still further object of this invention is to provide a bale thrower mounting structure which is relatively simply designed whereby it may be manufactured and assembled at low cost.

Other objects of this invention will be apparent hereinafter from the specification and from the recital in the appended claims.

In the drawing:

FIG. 1 is a fragmentary, generally diagrammatic, plan view of a hay baler having a bale thrower connected thereto, the thrower being supported on the baler by means constructed according to this invention and being shown in operative throwing position in solid lines and in a storage location in dotted lines;

FIG. 2 is a fragmentary side elevation of the thrower including the drive engine and showing the mounting for the thrower; and FIG. 3 is a transverse section through the bale case and showing in particular the frame of the thrower mounting structure.

Referring now to the drawing by numerals of reference, and first to FIG. 1, 10 denotes a hay baler having a frame 11 supported for ground travel by wheels 12. The baler moves forwardly in the direction indicated by the arrow 14. Along the left hand side of the baler facing forwardly, a bale case 15 is provided. The bale case has a top wall 16, a bottom wall 18, and side walls 19 and 20. The side wall 19 is located along the outboard left side of the baler while the side wall 20 is located inwardly and behind the housing 21 for the infeed mechanism of the baler. As the baler operates, bales are formed in the bale case 15. The bales progressively move rearwardly for discharge from the rearward end 22 of the bale case.

For receiving each bale as it comes from the bale case 15, a bale thrower 25 is provided and constructed substantially as shown in Patent No. 3,055,519. The thrower operates to traject each discharged bale to a trailing wagon, not shown. The thrower mechanism comprises a pair of wide, coextensive, parallel, upwardly and rearwardly inclined endless belts, namely upper belt 26 and lower belt 28. These belts are spaced relative to each other a distance substantially equal to the vertical dimension of the bales discharged from bale case 15. Belts 26 and 28 are made of rubber, canvas or the like and they are positioned to engage the top and bottom of each bale.

When viewed as shown in FIG. 2, belt 26 travels continuously at high speed in a clockwise direction indicated by the arrow 29. The lower belt 28 travels in a counterclockwise direction indicated by the arrow 30. The throwing belts are carried on rollers 31 supported on members 32 carried on support or framework 34. Support 34 includes a bottom member 35 over which each bale slides as it comes from the discharge end 22 of the bale case and serves to guide the bales upwardly and rearwardly to the throwing belts 26 and 28. When the belts engage each bale, they operate to impart a throwing force thereto to traject the bale in an upward and rearward direction.

The drive for belts 26 and 28 is provided by a gasoline engine 36 carried on an upper portion of support 34. An endless belt 38 extends around a drive sheave 39 on engine 36 and around a pair of driven sheaves 40 and 41 for the upper and lower belts, respectively. A tightening idler sheave is provided at 42 and spring biased in a tightening direction by a spring 44. The extension of the belt 38 is as shown in FIG. 2 whereby the upper throwing belt 26 travels clockwise and the lower belt 28 counterclockwise.

Bale thrower 25 is mounted on the bale case 15 for selective positioning in an operative location to engage and throw bales as shown in solid lines in FIG. 1 or in inoperative storage location as indicated in the dotted line position. This is made possible by means of mounting structure comprising a frame 50 which surrounds the discharge end 22 of the bale case and is connected thereto by a pair of upper support members 51 and a pair of lower support members 52. Along the side wall 20 of bale case 15 the frame 50 is provided with vertically extending heavy hinge member 53 having a pair of vertically spaced hinge elements 54. The support 34 of the thrower has a box portion 55 having along one side thereof forwardly projecting hinge elements 56 which rest against hinge members 54. Hinge pins 58 are provided which are adapted to extend vertically and project through the hinge members 54 and 56. When the pins 58 are in place, the thrower 25 is supported by hinge member 53 and the thrower 25 may be swung from the solid line position shown in FIG. 1 to the dotted line position alongside bale case side wall 20. A latch member 59 is carried on bale case side wall 20 to fasten to the thrower and to hold it in inoperative position.

In addition to the hinge member 53 on frame 50, the frame includes an upper bracket 60 and a lower bracket member 61 providing vertically aligned pivots for bolts 62 and 64, extendable through transverse upper and lower braces 65 and 66, respectively, of thrower box portion 55. When the bolts 62 and 64 are in place, and the hinge pins 58 removed, the thrower 25 is supported for swingable movement about the longitudinal center axis 68 of the bale case 15 whereby the thrower may be steered, as shown and described in Patent No. 3,015,519.

If it is desired to use the baler without the thrower, the thrower is positioned in a neutral location (FIG. 1) and the hinge pins 58 are dropped into place, through the holes in hinge members 54 and 56. Then the operator merely removes the bolts 62 and 64 whereupon the thrower is free to be swung to the storage dotted line location. The latch 59 is connected to the thrower support structure 34 and the thrower is held in proper location.

With the mounting structure described, the bale thrower 25 can be selectively positioned in operative or inoperative position as desired. The operator may move the thrrower to a desired location and without a hoist or special lift equipment. When in inoperative storage location, the thrower is behind the feeder housing 21 of the baler and within the operational dimensions of the baler. There is no lateral projection of the thrower beyond the path of travel of the baler when the thrower is in storage location. The arrangement provided is relatively inexpensive whereby the structure may be provided at a cost commensurate with present arrangements.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In combination, a hay baler having an elongated bale case which extends in a fore-and-aft direction relative to ground travel and along one side of the baler, said bale case having a vertical inside wall, a vertical outside wall, and a rearward end through which bales are discharged in a given path, a bale thrower, a frame on which said thrower is mounted, a first pivot means for connecting said thrower to said frame for lateral swinging movement about a vertical axis, and a second pivot means for connecting said thrower to said frame adjacent said vertical inside wall whereby said thrower may be selectively positioned in a first operative location in said path of discharged bales and in a second lateral location alongside said bale case inside wall wholly outside said path and forwardly of the bale case rearward end, said thrower being connected by said first pivot means when in said first operative location and the thrower being connected by said second pivot means when in said second location, said thrower receiving bales and trajecting them rearwardly from the baler when said frame is in said first position and when the frame is in said second position the baler being operable to discharge bales without using the thrower.

2. The combination recited in claim 1 wherein said second pivot means comprises cooperative hinge members against said thrower and frame, respectively, and removable hinge pins being provided to connect the hinge members.

3. The combination recited in claim 2 wherein said first pivot means comprises removable fasteners for connecting said thrower to said frame for pivotal movement laterally about a vertical axis along the longitudinal center of the bale case, said fasteners being operable when said hinge pins are removed.

4. The combination recited in claim 1 wherein latch means is provided for connecting said thrower to said bale case when the thrower is in said second location.

References Cited by the Examiner
UNITED STATES PATENTS

| | | | |
|---|---|---|---|
| 684,533 | 10/01 | Wettlaufer | 285—283 |
| 1,190,564 | 7/16 | Lindsay | 198—87 |
| 2,767,866 | 10/56 | Heinje | 214—42 |
| 3,055,519 | 9/62 | Hollyday | 198—125 X |

SAMUEL F. COLEMAN, *Primary Examiner.*

ERNEST A. FALLER, *Examiner.*